(12) United States Patent
Oto

(10) Patent No.: US 7,936,508 B2
(45) Date of Patent: May 3, 2011

(54) LAMINATED HALF-WAVE PLATE, POLARIZING CONVERTER, POLARIZED LIGHT ILLUMINATION DEVICE AND LIGHT PICKUP DEVICE

(75) Inventor: Masayuki Oto, Zama (JP)

(73) Assignee: Epson Toyocom Corporation, Tokyo (JP)

( * ) Notice: Subject to any disclaimer, the term of this patent is extended or adjusted under 35 U.S.C. 154(b) by 0 days.

(21) Appl. No.: 12/717,674

(22) Filed: Mar. 4, 2010

(65) Prior Publication Data
US 2010/0182691 A1 Jul. 22, 2010

Related U.S. Application Data

(62) Division of application No. 11/783,398, filed on Apr. 9, 2007.

(30) Foreign Application Priority Data

Apr. 10, 2006 (JP) ................................. 2006-107270
Apr. 4, 2007 (JP) ................................. 2007-097996

(51) Int. Cl.
*G02B 5/30* (2006.01)
(52) U.S. Cl. .............................. 359/489.07; 359/489.15
(58) Field of Classification Search .......................... None
See application file for complete search history.

(56) References Cited

U.S. PATENT DOCUMENTS

| 7,417,796 B2 | 8/2008 | Wang | |
|---|---|---|---|
| 2004/0246875 A1 | 12/2004 | Ooto | |
| 2007/0247633 A1 * | 10/2007 | Oto | 356/487 |
| 2008/0310285 A1 * | 12/2008 | Oto | 369/112.16 |

FOREIGN PATENT DOCUMENTS

| JP | A-10-068816 | 3/1998 |
|---|---|---|
| JP | A-2004-170853 | 6/2004 |
| JP | A-2004-272140 | 9/2004 |
| JP | A-2004-325759 | 11/2004 |

OTHER PUBLICATIONS

Ammann, O. E., "Synthesis of Optical Birefringement Networks," Progress in Optics IX, Amsterdam, North Holland Pub. Co, New York Interscience Publishers, 1971, pp. 123-177.
Office Action mailed Jul. 8, 2010 in U.S. Appl. No. 11/783,398.
Foreign Office Action dispatched Jul. 13, 2010 in Japanese Application No. 2007-097996 (with translation).
Office Action mailed Nov. 24, 2010 in U.S. Appl. No. 11/783,398.

* cited by examiner

*Primary Examiner* — Lee Fineman
(74) *Attorney, Agent, or Firm* — Oliff & Berridge, PLC

(57) ABSTRACT

First and second wave plates using quartz crystal having birefringence are laminated together in such a manner that their optical axes intersect to form a laminated wave plate functioning as a half-wave plate as a whole. Phase differences of the first and the second wave plates relative to an ordinary ray and an extraordinary ray with respect to a predetermined wavelength $\lambda$ are set to be $\Gamma 1$ and $\Gamma 2$, an order of a high-mode order is set to be a natural number n, whereby the high-order mode laminated half-wave plate is formed so as to satisfy: $\Gamma 1=180°+360°\times n$; and $\Gamma 2=180°+360°\times n$.

3 Claims, 12 Drawing Sheets

HALF-WAVE PLATE 41
STRETICHING AXIS : -15°

QUARTER-WAVE PLATE 43
STRETICHING AXIS : -75°

US 7,936,508 B2

LAMINATED HALF-WAVE PLATE, POLARIZING CONVERTER, POLARIZED LIGHT ILLUMINATION DEVICE AND LIGHT PICKUP DEVICE

This is a Division of application Ser. No. 11/783,398 filed Apr. 9, 2007, which in turn claims the benefit of Japanese Patent Application Nos. 2006-107270 filed Apr. 10, 2006 and 2007-097966 filed Apr. 4, 2007. The disclosure of the prior applications is hereby incorporated by reference herein in its entirety.

TECHNICAL FIELD

The present invention relates to a laminated wave plate, and more particularly to a high-order mode laminated wave plate with improved conversion efficiency, a polarizing converter using this, a polarized light illumination device using the polarizing converter and a pickup device using a high-order mode laminated wave plate.

BACKGROUND ART

Although optical wave plates have conventionally been used in optical pickup devices, liquid crystal displays, liquid crystal projectors and the like, it is necessary to have a function as a wave plate in a wavelength band of light used. For example, if it is a half-wave plate, it requires functions such as phase changes by 180° over a used wavelength band. In the case in which the half-wave plate is made of a single quartz crystal plate using birefringence of quartz crystal or the like, when an ordinary ray refractive index of the quartz crystal and an extraordinary ray refractive index thereof are set to be "no" and "ne", respectively, and a thickness of the quartz crystal plate is set to be "t", a phase difference Γ between the ordinary ray and the extraordinary ray when a light having a wavelength λ transmits through the half-wave plate is shown as Γ=2π/λ×(ne−no)×t, where the phase difference depends on the wavelength λ.

A broadband wave plate whose phase difference is approximately constant in a desired wavelength band has been disclosed in Patent Literature 1. A quarter-wave plate 40 shown in FIG. 12(a) is composed of a half-wave plate 41, an adhesive agent 42 and a quarter-wave plate 43. As shown in FIG. 12(b), with respect to a polarizing direction of a linearly polarized light incident on the quarter-wave plate 40, a streching axis of the half-wave plate 41 is positioned in a direction of −15° and a streching axis of the quarter-wave plate 43 is positioned in a direction of −75°. Here, the angles of the streching axes are described as angles at which a direction right from a y-axis is a positive direction within a yz plane. The half-wave plate 41 and the quarter-wave plate 43 are obtained by stretching and processing a polymer film of polycarbonate material. It is disclosed that the quarter-wave plate 40 functions as an approximately complete quarter-wave plate that is not dependent on wavelengths in a visible light range (400 nm-700 nm), where the function of the quarter-wave plate 40 is explained using a Poincare sphere.

Additionally, a laminated wave plate having a function as a half-wave plate by laminating a plurality of crystal plates has been disclosed in Patent Literature 2. FIG. 13(a) is a perspective view showing a structure of a half-wave plate 44, which is formed by laminating together quartz crystal plates 45 and 46. FIG. 13(b) is an exploded perspective view of the half-wave plate 44. The structure is disclosed in which the quartz crystal plate 45 having a phase difference Γ1 of 190° and an optical axis azimuth angle θ1 of 19° with respect to a wavelength of 420 nm are bonded to the quartz crystal plate 46 having a phase difference Γ2 of 200° and an optical axis azimuth angle θ2 of 64°, similarly, with respect to the wavelength of 420 nm in such a manner that their respective optical axes 49 and 50 intersect at an angle of 45° so as to function as a half-wave plate as a whole in high bands of wavelengths from 400 to 700 nm. As shown in FIG. 13 (a), it is disclosed that it has a function in which when a P polarized light 47 is incident on the half-wave plate 44, its phase is deviated by 180° on a light exiting surface, so that a polarizing plane of the incident light is rotated by 90° to be converted into an S polarized light. In addition, it is disclosed that a relationship between the optical axis azimuth angles θ1 and θ2 is expressed by θ2=θ1+45° and 0°<θ1<45°.

The function of the half-wave plate 44 is explained using the Poincare sphere. In a detailed analysis, when respective Muller matrixes of the crystal plates 45 and 46 are set to be A1 and A2 and respective Stokes vectors indicating incident and exiting polarization states are set to be T and S, the Stokes vector S is expressed by the following formula:

$$S = A2 \cdot A1 \cdot T \tag{1}$$

The phase difference of the half-wave plate 44 can be obtained from a component of the Stokes vector S.

[Patent Literature 1] Japanese Unexamined Patent Publication No. 10-68816.

[Patent Literature 2] Japanese Unexamined Patent Publication No. 2004-170853.

DISCLOSURE OF THE INVENTION

Problems to be Solved by the Invention

However, when a half-wave plate was manufactured by applying the quarter-wave plate described in Patent Literature 1 and used in a liquid crystal projector or the like, there was a problem that yellowing occurs due to a thermal effect. In addition, the half-wave plate described in Patent Literature 2 is formed by a single mode wave plate and is needed to be processed such that a phase difference of each of the two quartz crystal plates becomes approximately 180°. In the case of actually manufacturing a quartz crystal plate, it is desirable to set such that a thickness of the quartz crystal plate is set to be equal to or greater than 100 μm in consideration of the ease of grinding, yield and the like. Consequently, when manufacturing a quartz crystal plate having the phase difference of approximately 180° from a refractive index difference between an ordinary ray and an extraordinary ray, its thickness becomes dozens of μm, where there were problems of reduced yield and of time-consuming processing.

As a means for solving the problem of the thickness, it is possible to reduce the above refractive index difference and increase the thickness of the quartz crystal plate by cutting the quartz crystal plate in such a manner that an optical axis of the quartz crystal plate is in an oblique direction from a normal line direction on a main surface of the quartz crystal plate. Therefore, in Patent Literature 2, considering processablity of the thickness of the quartz crystal plate used, it is disclosed that a cut angle of the quartz crystal plate is set to be an angle at which an optical axis is 27° with respect to a normal line direction on the main surface of the quartz crystal plate, what is called, the cut angle is set to be 27° Z. However, when the cut angle of the quartz crystal plate is 27° Z, a problem arises that changes in the phase difference of the half-wave plate with respect to incident angles increase. When using a wave plate in a liquid crystal projector or an optical system of an optical pickup, the wave plate is sometimes arranged on a path where light conically converges (disperses) in relation to arrangements of an optical source and a lens system. In this case, although a portion near the center of a light ray is incident vertically on the wave plate, an incident angle occurs at a conic edge. Accordingly, when using the half-wave plate in which phase difference variation increases with respect to incident angles, there arises a problem of causing a loss in an amount of light.

FIG. 14 is a drawing for showing conversion efficiencies with respect to wavelengths from 350 to 750 nm by changing the incident angle of the single mode half-wave plate by −5°, 0° and +5°. Using a Z-plate with the cut angle of 27°, the single mode half-wave plate is formed by laminating together the quartz crystal plate 45 with the phase difference $\Gamma 1$ of 190° and the optical axis azimuth angle $\theta 1$ of 19° with respect to the wavelength of 420 nm and the quartz crystal plate 46 with the phase difference $\Gamma 2$ of 200° and the optical axis azimuth angle $\theta 2$ of 64°, similarly with respect to the wavelength of 420 nm, in such a manner that their respective optical axes 49 and 50 intersect at an angle of 45°.

In this case, the conversion efficiency indicates a ratio for converting P polarized light into S polarized light, where when the conversion efficiency is 1, all P polarized light are converted into S polarized light. Although it is desirable that the conversion efficiency should be as high as possible, it is generally said that it is needed to be at least 0.93. As clear in FIG. 14, at the incident angle of 5°, there was a problem that the conversion efficiency falls below 0.9 at wavelengths equal to or greater than 525 nm.

The invention is directed to provide a high-order mode laminated wave plate that can solve the above problems of yellowing, yield under processing, incident angles and the like.

Means for Solving the Problems

The laminated wave plate of the present invention is a laminated wave plate that functions as a half-wave plate as a whole by laminating together a first wave plate having a phase difference $\Gamma 1$ with respect to a wavelength $\lambda$, and a second wave plate having a phase difference $\Gamma 2$ with respect thereto in such a manner that their optical axes intersect. When an in-plane azimuth angle of the first wave plate is set to be $\theta 1$, an in-plane azimuth angle of the second wave plate is set to be $\theta 2$, and an angle formed by a polarizing direction of linearly polarized light incident on the laminated wave plate and a polarizing direction of linearly polarized light exiting the laminated wave plate is set to be $\theta$, the laminated wave plate is formed so as to satisfy following formulas (1) to (3):

$\Gamma 1=180°+360°\times n$; $\Gamma 2=180°+360°\times n$; and $\theta 2=\theta 1+\theta/2$, in which n was formed so as to satisfy a natural number starting with 1.

According to such a laminated wave plate, appropriately setting n has an effect of allowing thicknesses of the two wave plates forming the laminated wave plate to be processable thicknesses.

Additionally, in the laminated wave plate of the present invention, n=4, $\theta 1=22.5°$ and $\theta 2=67.5°$ were set. With this structure, there is an effect of allowing a wavelength-conversion efficiency index of the laminated wave plate to be approximately 1 in a 400 nm band, a 500 nm band and a 675 nm band as wavelength bands of blue, green and red used in a liquid crystal projector.

Additionally, in the laminated wave plate of the present invention, n=5, $\theta 1=22.5$ and $\theta 2=67.5°$ were set. With this structure, there is an effect of allowing the wavelength-conversion efficiency of the laminated wave plate to be approximately 1 in a 405 nm band, a 660 nm band and a 785 nm band required as a wavelength plate used in a triple-wavelength compatible optical pickup.

In addition, a laminated wave plate of the present invention is a laminated wave plate that functions as a half-wave plate as a whole by laminating together a first wave plate having a phase difference $\Gamma 11$ with respect to a wavelength $\lambda$, and a second wave plate having a phase difference $\Gamma 22$ with respect thereto in such a manner that their respective optical axes intersect. When an in-plane azimuth angle of the first wave plate is set to be $\theta 3$, an in-plane azimuth angle of the second wave plate is set to be $\theta 4$, and a phase difference of the second wave plate with respect to a wavelength $\lambda 1$ is set to be $\Gamma 211$, while a phase difference thereof with respect to a wavelength $\lambda 2(\lambda 1<\lambda 2)$ is set to be $\Gamma 222$, the laminated wave plate is formed so as to satisfy: $\Gamma 11=360°+360°\times 2\times n$; $\Gamma 22=180°+360°\times n$; $\cos 2\theta 3=1-(1-\cos \Delta\Gamma 2)/\{2(1-\cos \Delta\Gamma 2)\}$; and $\theta 4=45°\pm 10°$, in which n is a natural number starting with 1 and $\Delta\Gamma 2=(\Gamma 222-\Gamma 211)/2$. According to such a laminated wave plate, appropriately setting orders n1 and n2 has an effect of allowing the thicknesses of the two wave plates forming the laminated wavelength to be processable thicknesses.

Additionally, in the laminated wave plate of the present invention, n=4 and $\theta 3=-16°$ or $-21°$ were set. With this structure, there is an effect of allowing a wavelength-conversion efficiency of the laminated half-wave plate to be equal to or greater than 0.94 in the 400 nm band, the 500 nm band and the 675 nm band as the wavelength bands of blue, green and red used in a liquid crystal projector.

Additionally, in the laminated wave plate of the present invention, n=5, $\theta 3=-16°$ or $-21°$ were set. With this structure, there is an effect of allowing the wavelength-conversion efficiency of the laminated wave plate to be equal to or greater than approximately 0.94 in the 405 nm band, the 660 nm band and the 785 nm band required as a wave plate used in a triple-wavelength compatible optical pickup.

It is characterized in that a polarizing converter is formed by laminating the above laminated wave plate onto a plane from which a P polarized light of a polarized light beam splitter array exits obliquely.

In this manner, forming the polarizing converter using the above wave plate has an effect of allowing intensity of linearly polarized light (S polarized light) exiting from the polarizing converter to be increased.

Additionally, a polarized light illumination device of the present invention is formed by including the laminated wave plate of the invention. In this manner, forming the illumination device using the laminated wave plate of the invention has an effect of allowing the intensity of linearly polarized light (S polarized light) exiting from the illumination device to be increased. Additionally, an optical pickup device of the present invention is formed by including the laminated wave plate of the invention. In this manner, when the triple-wavelength compatible optical pickup device is formed by using the laminated wave plate of the invention, it can be achieved with the single laminated wave plate, although three half-wave plates have been conventionally required.

Additionally, when the triple-wavelength compatible optical pickup device is formed by using the laminated wave plate of the invention and a laser diode emitting laser light having triple wavelengths, it is possible to significantly reduce optical components, whereby there is an effect that cost of the optical pickup device can be reduced.

DESCRIPTION OF THE SYMBOLS 1, 1', 19 and 24 ... laminated half-wave plate, 2, 2', 3 and 37 ... wave plate, 4 and 5 linearly polarized light, 6, 6', 7 and 7' ... optical axis, θ1, θ2, θ3 and θ4 ... azimuth angle of an optical axis, 10 ... polarizing converter, 11 ... beam splitter array, 12 ... optical axis, 13 ... polarized light separation portion, 14 ... reflective film, 15 ... light emitting light source, 16 ... lamp, 17 ... reflecting mirror, 18 ... lens array, 20 and 35 ... optical pickup device, 21, 22, 24, 36a, 36b and 36c ... laser diode (LD), 23 ... dichroic prism, 25 ... wavelength separation element, 26 ... laminated half-wave plate, 27 ... mirror, 28 ... front monitor, 29 ... collimate lens, 30 ... quarter-wave plate, 33 ... collective lens, 34 ... photodetection element (PD), and 36 ... hybrid laser diode (LD).

BEST MODE FOR CARRYING OUT THE INVENTION

Figure 1A:
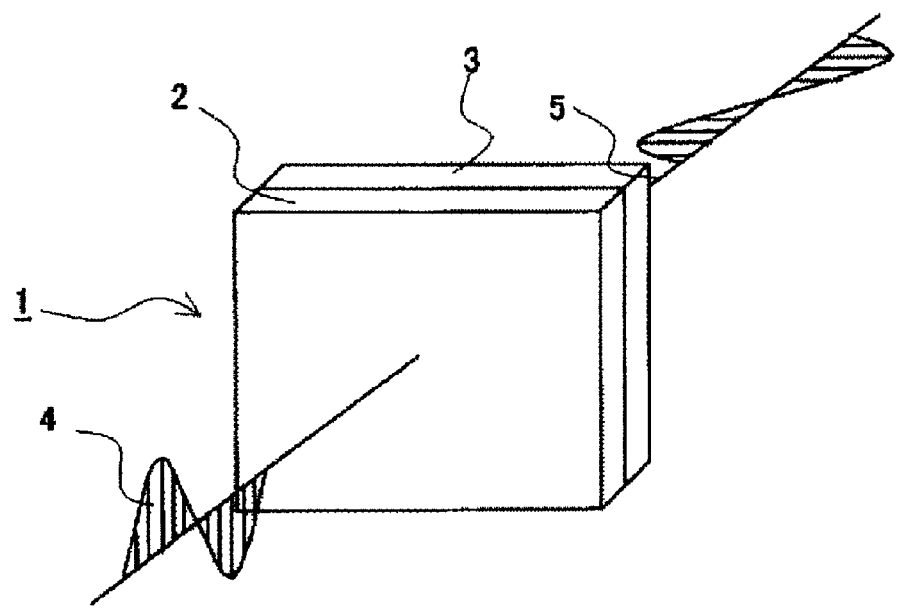
FIG. 1(a) is a schematic perspective view showing a structure of a laminated half-wave plate of a high-order mode according to the present invention, and (b) is an exploded perspective view.
Figure 1B:
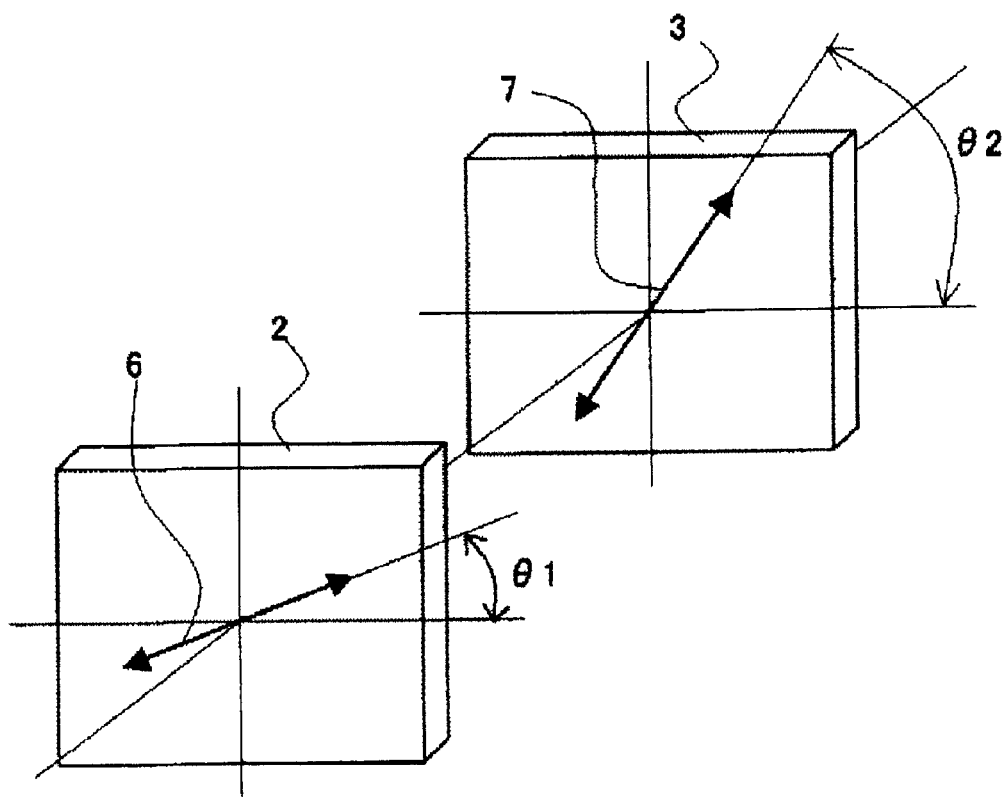

Hereinafter, embodiments of the present invention will be explained in detail based on the drawings. FIG. 1(a) is a perspective view showing a structure of a laminated half-wave plate 1 of a high-order mode (hereinafter referred to as a laminated half-wave plate) according to the present invention. It includes a structure in which a first wave plate 2 and a second wave plate 3 using quartz crystal are bonded together in such a manner that their respective optical axes intersect, so that it is formed so as to function as a half-wave plate as a whole. FIG. 1(b) is an exploded perspective view of the half-wave plate 1, in which an optical axis azimuth angle of the first wave plate 2 is set to be θ1 and an optical axis azimuth angle of the second wave plate 3 is set to be θ2. A phase difference of the first wave plate 2 with respect to a predetermined wavelength λ, for example, 400 nm, is set to be Γ1, and a phase difference of the second wave plate 3 with respect thereto is set to be Γ2, in which thicknesses of the first and the second wave plates 2 and 3 are set so as to satisfy:

$$\Gamma 1 = 180° + 360° \times n \quad (2); \text{ and}$$

$$\Gamma 2 = 180° + 360° \times n \quad (3).$$

Here, n is an order of the high-order mode and a natural number starting with 1.

When the half-wave plate 1 is formed as a whole by using high-order mode wave plates as the first and the second wave plates 2 and 3, it is difficult to maintain a phase difference of 180° over the entire wavelength band from wavelengths 350 to 750 nm.

Thus, in order to obtain the phase difference of 180° in a plurality of desired wavelength bands, a method was employed in which Stokes vectors of lights exiting the laminated half-wave plate 1 were calculated by varying orders n1 and n2 of the respective high-order modes of the first and the second wave plates 2 and 3, the respective phase differences Γ1 and Γ2 at a pretermined wavelength and the respective optical axis azimuth angles θ1 and θ2, which are structural parameters of the laminated half-wave plate 1, whereby phase differences, conversion efficiencies and the like were obtained.

First, a brief explanation will be given about a calculation method by which embodiments of the laminated half-wave plate according to the present invention were found. A polarization state after a linearly polarized light has transmitted through the two wave plates can be expressed using a Muller matrix or a Jones matrix.

$$E = R_2 \cdot R_1 \cdot I \quad (4)$$

Here, the I is a vector indicating a polarization state of an incident light, and the E is a vector indicating a polarization state of an exiting light. The $R_1$ will be expressed by a Muller matrix of the first wave plate 2 in the laminated half-wave plate 1 and the $R_2$ will be expressed by a Muller matrix of the second wave plate 3 therein, which will be expressed by each of following formulas:

[Formula 1]

$$R_1 = \begin{bmatrix} 1 & 0 & 0 & 0 \\ 0 & 1-(1-\cos\Gamma 1)\sin^2 2\theta 1 & (1-\cos\Gamma 1)\sin 2\theta 1 \cos 2\theta 1 & -\sin\Gamma 1 \sin 2\theta 1 \\ 0 & (1-\cos\Gamma 1)\sin 2\theta 1 \cos 2\theta 1 & 1-(1-\cos\Gamma 1)\cos^2 2\theta 1 & \sin\Gamma 1 \cos 2\theta 1 \\ 0 & \sin\Gamma 1 \sin 2\theta 1 & -\sin\Gamma 1 \cos 2\theta 1 & \cos\Gamma 1 \end{bmatrix} \quad (5)$$

-continued

[Formula 2]

$$R_2 = \begin{bmatrix} 1 & 0 & 0 & 0 \\ 0 & 1-(1-\cos\Gamma 2)\sin^2 2\theta 2 & (1-\cos\Gamma 2)\sin 2\theta 2\cos 2\theta 2 & -\sin\Gamma 1\sin 2\theta 2 \\ 0 & (1-\cos\Gamma 2)\sin 2\theta 2\cos 2\theta 2 & 1-(1-\cos\Gamma 2)\cos^2 2\theta 2 & \sin\Gamma 2\cos 2\theta 2 \\ 0 & \sin\Gamma 2\sin 2\theta 2 & -\sin\Gamma 2\cos 2\theta 2 & \cos\Gamma 2 \end{bmatrix} \quad (6)$$

The orders n of the high-order modes of the first and the second wave plates 2 and 3 are determined, and their respective phase differences Γ1 and Γ2 and the optical axis azimuth angles θ1 and θ2 are set, whereby the Muller matrixes $R_1$ and $R_2$ are obtained using the formulas (5) and (6). Then, when the polarization state I of an incident light is set, the polarization state E of an exiting light can be calculated by the formula (4).

When explaining about the case of using the Muller matrix as a matrix, the polarization state of the exiting light will be expressed by a following formula:

[Formula 3]

$$E = \begin{bmatrix} S_{01} \\ S_{11} \\ S_{21} \\ S_{31} \end{bmatrix} \quad (7)$$

Matrix elements $S_{01}$, $S_{11}$, $S_{21}$ and $S_{31}$ of the E are called Stokes parameters and indicate polarization states. With the use of the Stoke parameters, the phase difference Γ of the wave plate will be expressed as a following formula:

[Formula 4]

$$\Gamma = \tan^{-1} \frac{S_{31}}{\sqrt{S_{11}^2 + S_{21}^2}} \quad (8)$$

In this manner, the phase difference can be calculated using the formula (8).

As shown in FIG. 1, the laminated half-wave plate 1 according to the invention has a function for rotating the polarizing plane of the linearly polarized light by the predetermined angle θ. For example, a case will be examined using the Poincare sphere shown in FIG. 2(a), in which as an input light, a linearly polarized light 4 having an oscillating plane in a vertical direction is transmitted through the laminated half-wave plate 1 and its polarizing plane is rotated (phase modulation) by θ=90° to allow it to exit as a linearly polarized light 5 having an oscillating plane in a horizontal direction. When the phase modulation (rotation of 90°) is examined with the Poincare sphere, it means a modulation from an incident polarization state P0 to P2, and at this time, a necessary phase difference is 180°. However, even in cases of modulations from P0 to Pa and P0 to Pb, the phase difference is each 180° as well. In other words, when evaluated by using the phase difference, it is impossible to determine whether it has been modulated into a necessary polarization state. The P2 and different points Pa and Pb on the Poincare sphere (on an equator) are azimuths of the polarizing plane. In order to detect them, a product of the matrix E indicating the polarization state of the exiting light multiplied by a matrix P of a polarizer is calculated and an amount of light obtained is set as an evaluation value, whereby the polarization state can be determined properly. This is defined as a conversion efficiency.

Specifically, a transmission axis of the matrix P of the polarizer is set to be 90°, and from Stokes parameters of a matrix T obtained from the product of the matrix P multiplied by the matrix E indicating the exiting light polarization state, an amount of light of a polarizing plane component in the direction of 90° can be calculated. The product of the matrix E indicating the exiting light polarization state multiplied by the matrix P of the polarizer will be expressed as a following equation.

$$T = P \cdot E \quad (9)$$

Here, the matrix T indicates conversion efficiencies and when expressed with Stokes parameters of the elements, it will be expressed as a following formula:

[Formula 5]

$$T = \begin{bmatrix} S_{02} \\ S_{12} \\ S_{22} \\ S_{32} \end{bmatrix} \quad (10)$$

Here, the $S_{02}$ of the Stokes parameter of the vector T indicates an amount of light. If the amount of an incident light is set to be 1, the $S_{02}$ will be a conversion efficiency. The phase difference and the conversion efficiency can be both obtained from the matrix E indicating the polarization state after light has transmitted through the laminated half-wave plate.

Using the above conversion efficiency as an evaluation criterion, simulations were performed with a calculating machine by varying the orders n of the high-order modes of the first and the second wave plates 2 and 3, the respective phase differences Γ1 and Γ2 at predetermined wavelengths (for example, a wavelength of 400 nm) and the respective optical axis azimuth angles θ1 and θ2, which are the parameters of the laminated half-wave plate. The simulations were repeated to select the above-mentioned parameters obtained when the conversion efficiency was favorable in the plurality of desired wavelength bands. When the order n of the high-order mood is too large, it narrows a wavelength bandwidth in which the conversion efficiency is near 1, which makes it difficult to use it as the laminated half-wave plate. Therefore, the above-mentioned parameters were selected including the ease of manufacturing and the like. The results will be explained below.

Figure 3:
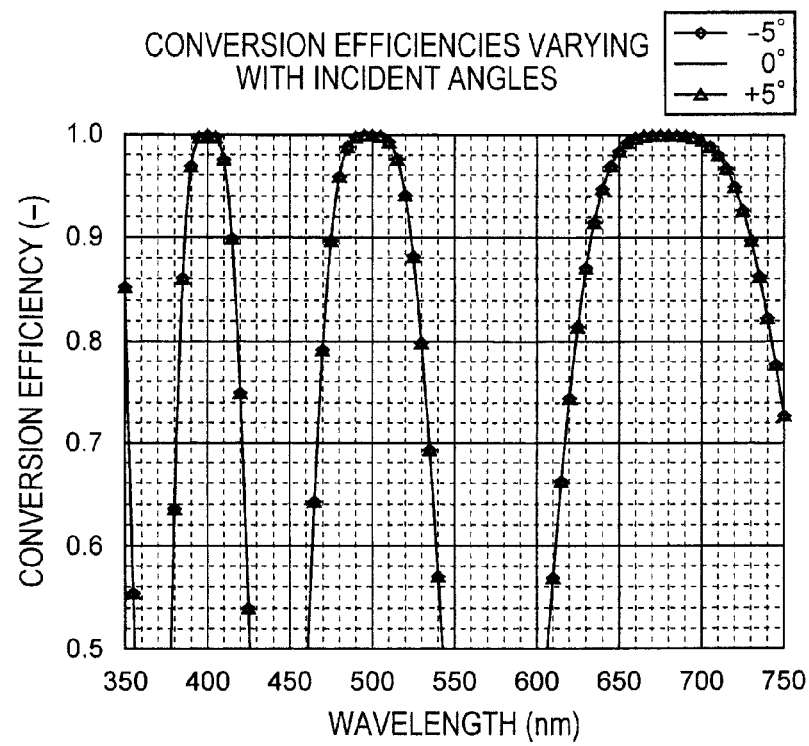
FIG. 3 A wavelength-conversion efficiency characteristic view of the laminated half-wave plate according to the invention.

Cut angles of the first and the second wave plates 2 and 3 of the laminated half-wave plate 1 shown in FIG. 1 are set to be 90° Z (an intersection angle of a normal line direction and an optical axis (z axis) on a main surface of the quartz crystal plate is 90°), the order n of the high-order mode is set to be 4 and the wavelength λ is set to be 400 nm. The phase difference Γ1 and the optical axis azimuth angle θ1 of the first wave plate are set to be 1620° (=180°+360°×4) and 22.5°, respectively, and the phase difference Γ2 and the optical axis azimuth angle θ2 of the second wave plate are set to be 1620° (=180°+360°×4) and 67.5°, respectively. In the conditions above, the conversion efficiencies of the laminated half-wave plate 1 were obtained by the simulations, with the result that favorable wavelength-conversion efficiencies were obtained. FIG. 3 is a drawing for showing the conversion efficiencies of the laminated half-wave plate 1 with respect to wavelengths from 350 to 750 nm.

The conversion efficiencies obtained when the incident angle to the laminated half-wave plate 1 is 0° are indicated by solid lines, while the conversion efficiencies obtained when the incident angles are −5° and +5°, respectively, are indicated by putting rhombic or triangular marks. They almost overlap to form curves. Since the wavelengths of blue, green and red used in a liquid crystal projector are the 400 nm band, the 500 nm band and the 675 nm band, respectively, it was proved that the conversion efficiencies of the laminated half-wave plate 1 at the above-mentioned parameters are approximately 1.

Figure 4:
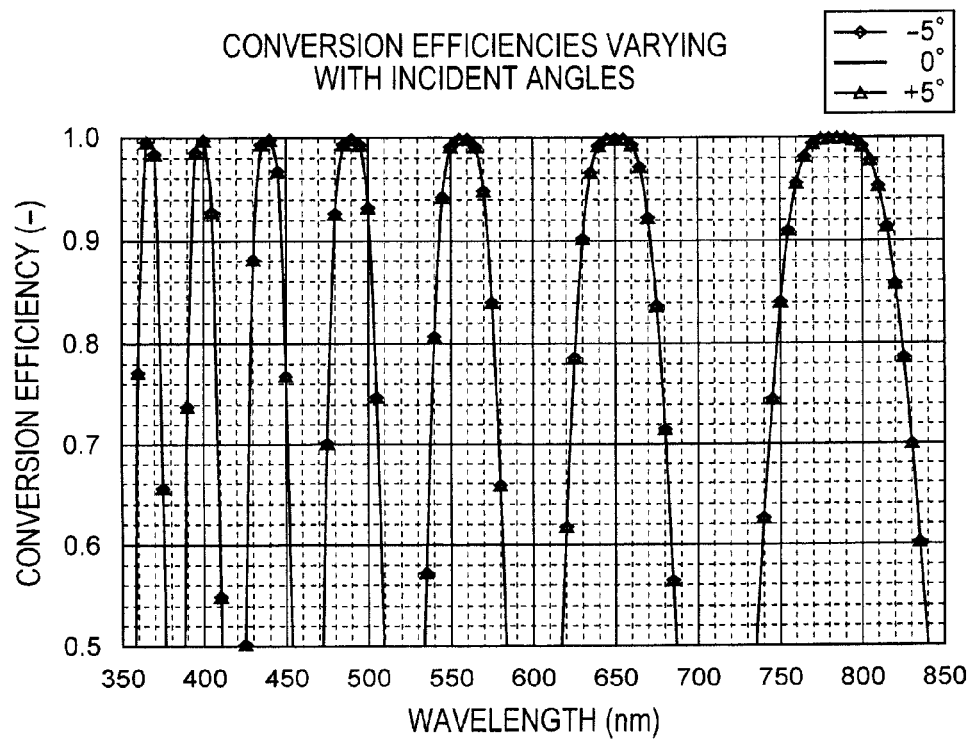
FIG. 4 A wavelength-conversion efficiency characteristic view of another laminated half-wave plate according to the invention.

Furthermore, the cut angles of the first and the second wave plates 2 and 3 of the laminated half-wave plate 1 are each set to be 90° Z (the intersection angle of the normal line direction and the optical axis (z axis) on the main surface of the quartz crystal plate is 90°), the order n of the high-order mode is set to be 5 and the wavelength λ is set to be 400 nm. In addition, the phase difference Γ1 and the optical axis azimuth angle θ1 of the first wave plate are set to be 1980° (=180°+360°×5) and 22.5°, respectively, and the phase difference Γ2 and the optical axis azimuth angle θ2 of the second wave plate are set to be 1980° (=180°+360°×5) and 67.5°, respectively. In the conditions above, favorable conversion efficiencies were obtained. FIG. 4 is a drawing for showing the conversion efficiencies of the laminated half-wave plate 1 with respect to the wavelengths from 350 to 750 nm. The conversion efficiencies obtained when the incident angle to the laminated half-wave plate 1 is 0° are indicated by solid lines, while the conversion efficiencies obtained when the incident angles are −5° and +5°, respectively, are indicated by putting rhombic or triangular marks. They almost overlap to form curves. In the case of the laminated half-wave plate 1 using the above-mentioned parameters, it was proved that the conversion efficiencies are approximately 1 in the wavelengths of the 405 nm band, the 660 nm band and the 785 nm band, which are required as a wave plate used in a triple-wavelength compatible optical pickup.

Figure 2A:
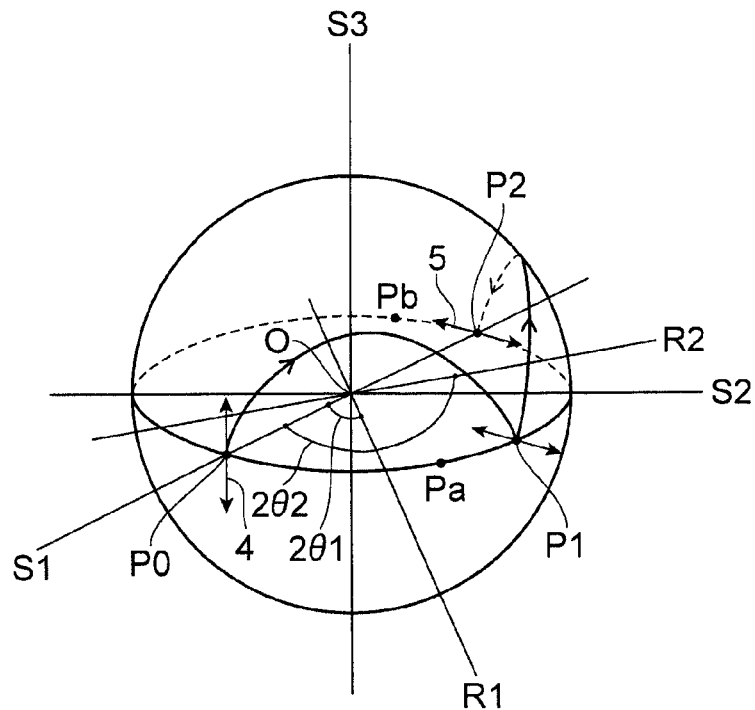
FIG. 2(a) is a perspective view of a Poincare sphere for explaining the present invention, and (b) is a perspective view to an S1S2 plane of the Poincare sphere.

Here, regarding a relationship between the optical axis azimuth angle θ1 of the first wave plate 2 and the optical axis azimuth angle θ2 of the second wave plate 3, an explanation will be given using the Poincare sphere shown in FIG. 2. FIG. 2(a) is a drawing for explaining a transition of a path of a linearly polarized light incident on the half-wave plate 1 on the Poincare sphere. It is shown that, when the light is incident as the linearly polarized light 4 whose polarizing direction is a direction vertical to the equator from the predetermined position P0 on the equator, it is rotated by 180° around an optical axis R1 by the first wave plate 2 to be shifted to a P1 (on the equator), then rotated by 180° around an optical axis R2 by the second wave plate 3 to reach the P2 (on the equator), and it turns to be the linearly polarized light 5 rotated by θ=90° with respect to the linearly polarized light 4 to exit the half-wave plate 1.

Next, using FIG. 2(b), the relationship between the θ1 and the θ2 will be discussed.

Figure 2B:
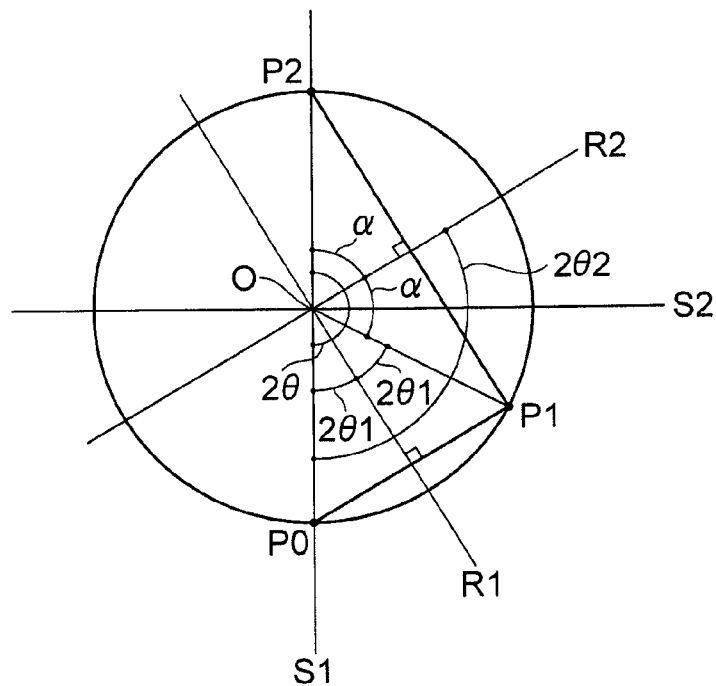

FIG. 2(b) shows a drawing of the path of the polarization state of the light incident on the half-wave plate 1 on the Poincare sphere shown in FIG. 2(a)m, which is viewed from an S3 axis direction (the drawing thereof projected on an S1S2 plane). A relationship among the optical axis azimuth angle θ1 of the first wave plate 2, the optical axis azimuth angle θ2 of the second wave plate 3 and a rotational angle θ of the linearly polarized light 5 (exiting light) with respect to the linearly polarized light 4 (incident light) can be shown on the Poincare sphere, as in FIG. 2(b).

A triangle OP0P1 formed by connecting points O, P0 and P1 is an isosceles triangle whose top point is the point O. The optical axis R1 is a bisector line of the triangle OP0P1. An angle formed by a side OP0 and the optical axis R1 and an angle formed by a side OP1 and the optical axis R1 are 2θ1. A triangle OP1P2 formed by connecting points O, P1 and P2 is an isosceles triangle whose top point is the point O, and the optical axis R2 is a bisector line of the triangle OP1P2. Here, an angle α formed by the side OP1 and the optical axis R2 and an angle α formed by the side OP2 and the optical axis R2 are obtained as follows:

2θ=2×2θ1+2α; and

α=θ−2θ1.

Accordingly, an angle 2θ2 formed by the side OP0 and the optical axis R2 can be expressed as follows:

2θ2=α+2×2θ1=θ−2θ1+2×2θ1=θ+2θ1.

Thus, θ2 can be expressed as:

θ2=θ1+θ/2 (11).

Figure 5:
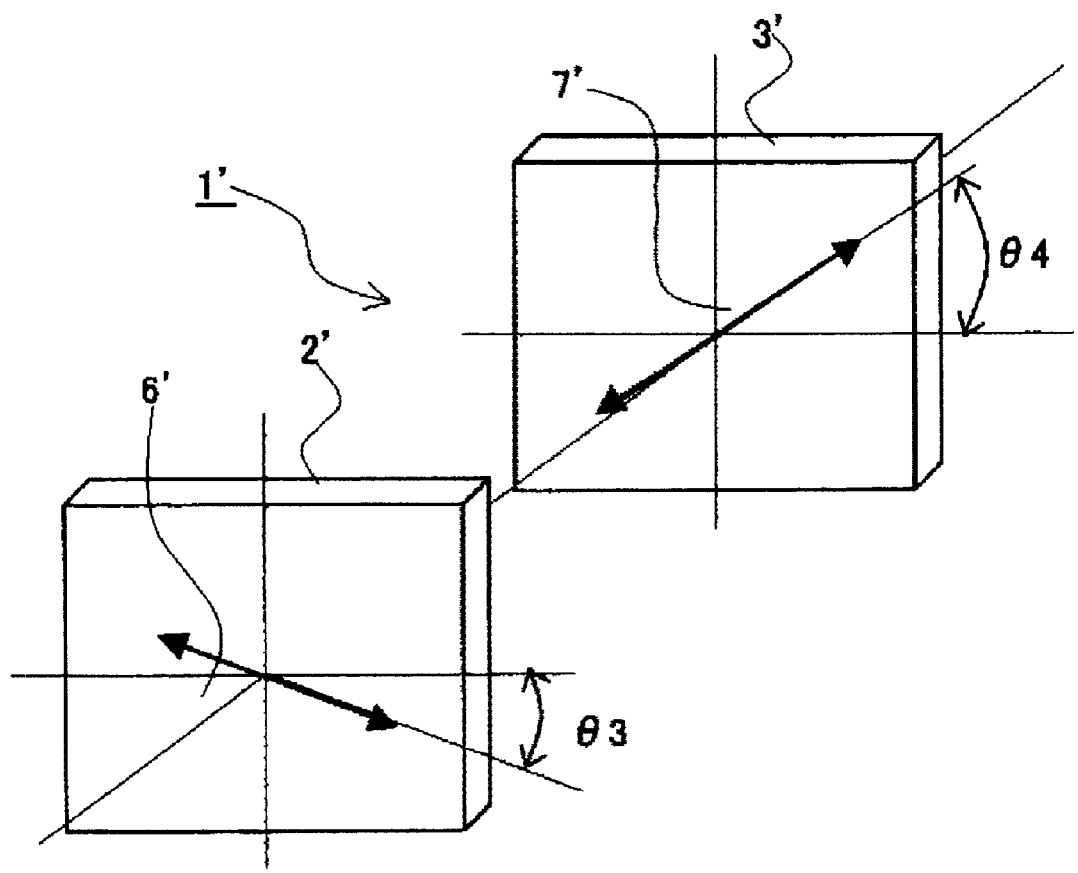
FIG. 5 An exploded perspective view of a laminated half-wave plate according to a second embodiment.

Next, FIG. 5 is an exploded perspective view of a high-order mode laminated half-wave plate (hereinafter referred to as a laminated half-wave plate) 1' according to a second embodiment of the present invention. It has a structure in which a first wave plate 2' and a second wave plate 3' are boned together in such a manner that their respective optical axes intersect to allow it to function as a half-wave plate as a whole. Orders of high-order modes of the first and the second wave plates 2' and 3' are set to be n1 and n2, respective phase differences of the first and the second wave plates 2' and 3' are set to be Γ11 and Γ22, and optical axis azimuth angles thereof are each θ3 and θ4, respectively. The wavelength λ for determining the phase differences is set to be 400 nm, and the order n is set to be a natural number starting with 1. Structural conditions of the laminated half-wave plate 1' of the second embodiment were set as following formulas:

Γ11=360°+360°×2×n (12); and

Γ22=180°+360°×n (13).

The various parameters n, Γ11, Γ22, θ3 and θ4 constituting the first and the second wave plates 2' and 3' were set so as to satisfy the formulas (12) and (13) to form the laminated half-wave plate 1'. Simulations were performed by varying the above parameters to obtain a combination of the parameters showing a favorable conversion efficiency. As a result, the wavelength-conversion efficiency characteristics became favorable in a case in which when cut angles of the first and the second wave plates 2' and 3' were set to be each 90° Z (the intersection angle of the normal line direction and the optical axis (z axis) on the main surface of the quartz crystal plate is 90°), the order n of the high-order mode was set to be 4 and the wavelength λ was set to be 400 nm, the phase differences Γ1 and Γ2 of the third and the fourth wave plates 2' and 3' were 3240° (=360°+360°×2×4) and 1620° (=180°+360°×4), respectively, and the optical axis azimuth angles θ3 and θ4 were −16° and 45°, respectively.

Figure 6A:
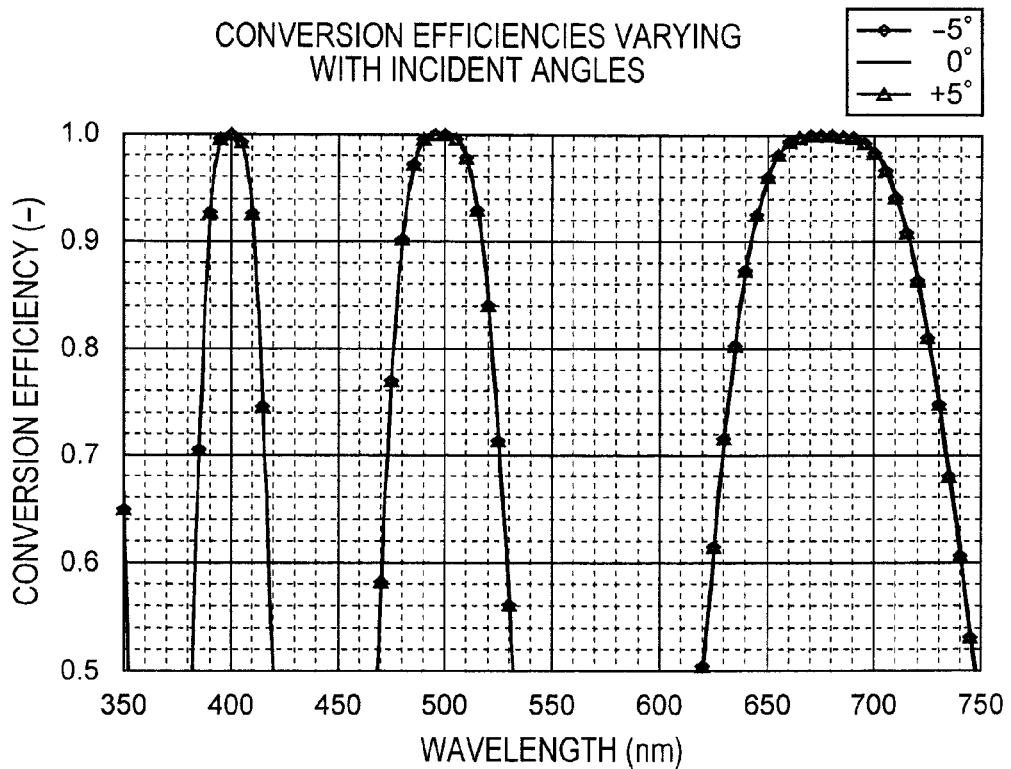
FIG. 6(a) is a wavelength-conversion efficiency characteristic view of the laminated half-wave plate according to the second embodiment, and (b) is a wavelength-conversion efficiency characteristic view thereof after optimization.
Figure 6B:
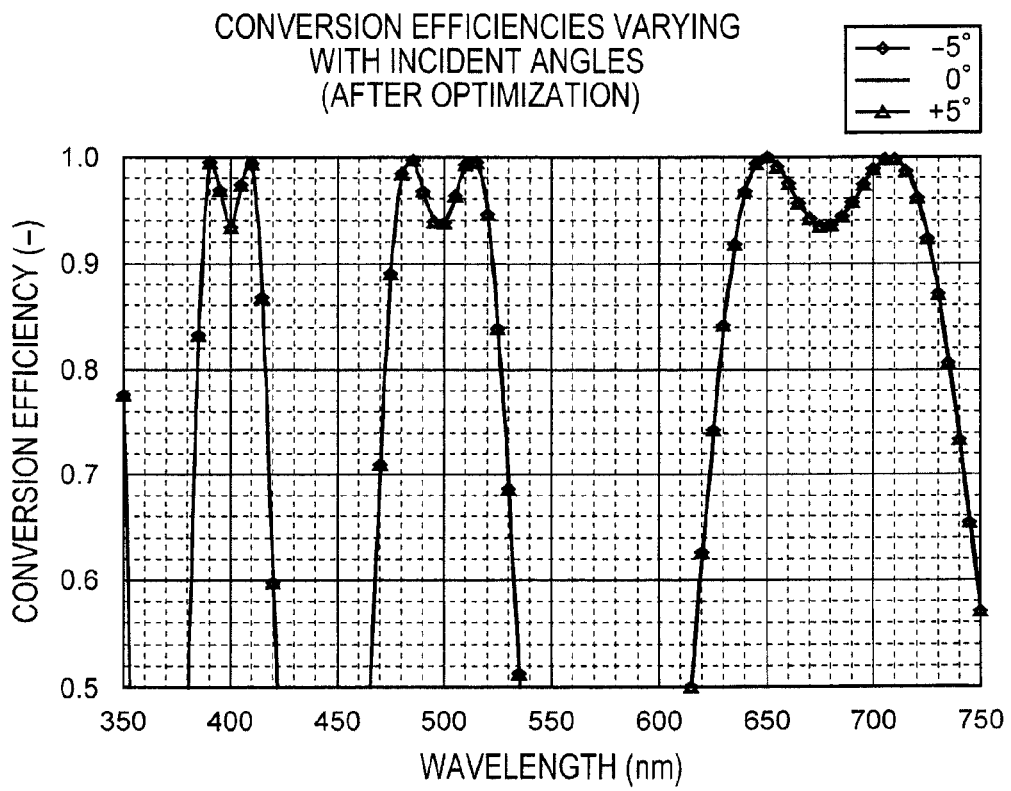

FIG. 6(a) is a drawing for showing the conversion efficiency characteristics of the laminated half-wave plate 1' with respect to wavelengths from 350 to 750 nm. The conversion efficiencies of the laminated half-wave plate 1' obtained when an incident angle is 0° are indicated by solid lines, while the conversion efficiencies obtained when the incident angles are −5° and +5°, respectively, are indicated by putting rhombic or triangular marks. They almost overlap to form curves. Since the wavelengths of blue, green and red used in a liquid crystal projector are the 400 nm band, the 500 nm band and the 675 nm band, respectively, it was proved that the conversion efficiencies of the laminated half-wave plate 1' are equal to or greater than 0.94. Furthermore, when optimization was attempted for the θ3 and the θ4, compared with the wavelength-conversion efficiency characteristics shown in FIG. 6(a), the wavelength-conversion efficiency characteristics, as shown in FIG. 6(b), could increase the bandwidths of the 400 nm band, the 500 nm band and the 675 nm band, respectively. Additionally, values of their respective optical axis azimuth angles after the optimization are θ3=−21° and θ4=37.5°.

Figure 7A:
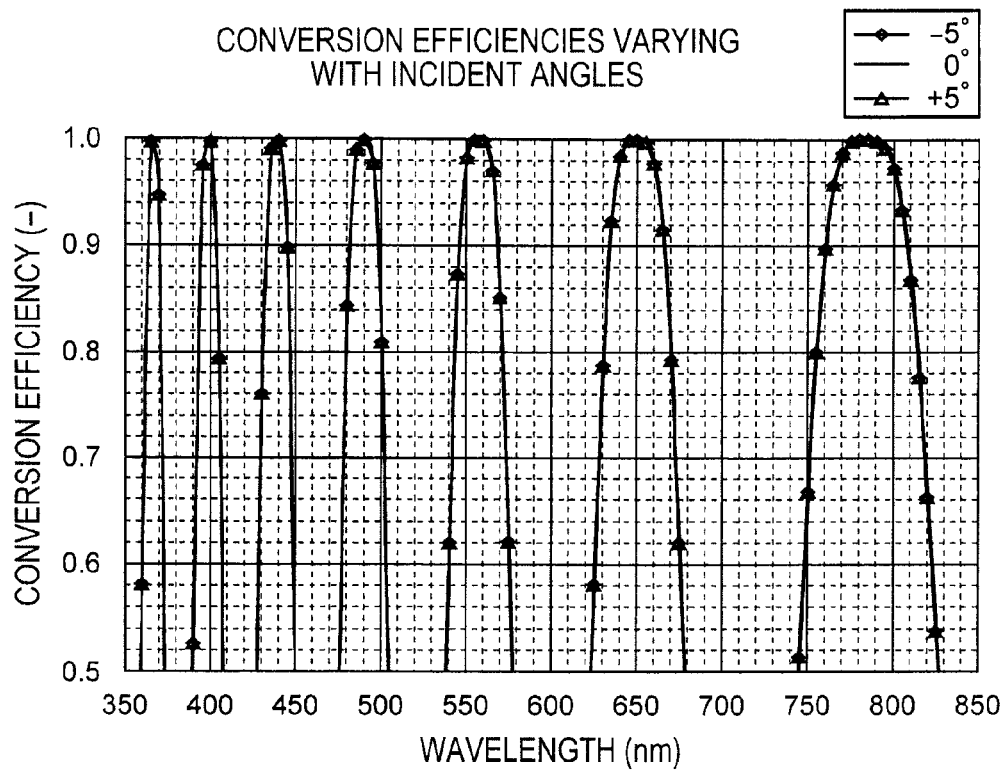
FIG. 7(a) is a wavelength-conversion efficiency characteristic view of another laminated half-wave plate according to the second embodiment, and (b) is a wavelength-conversion efficiency characteristic view thereof after optimization.
Figure 7B:
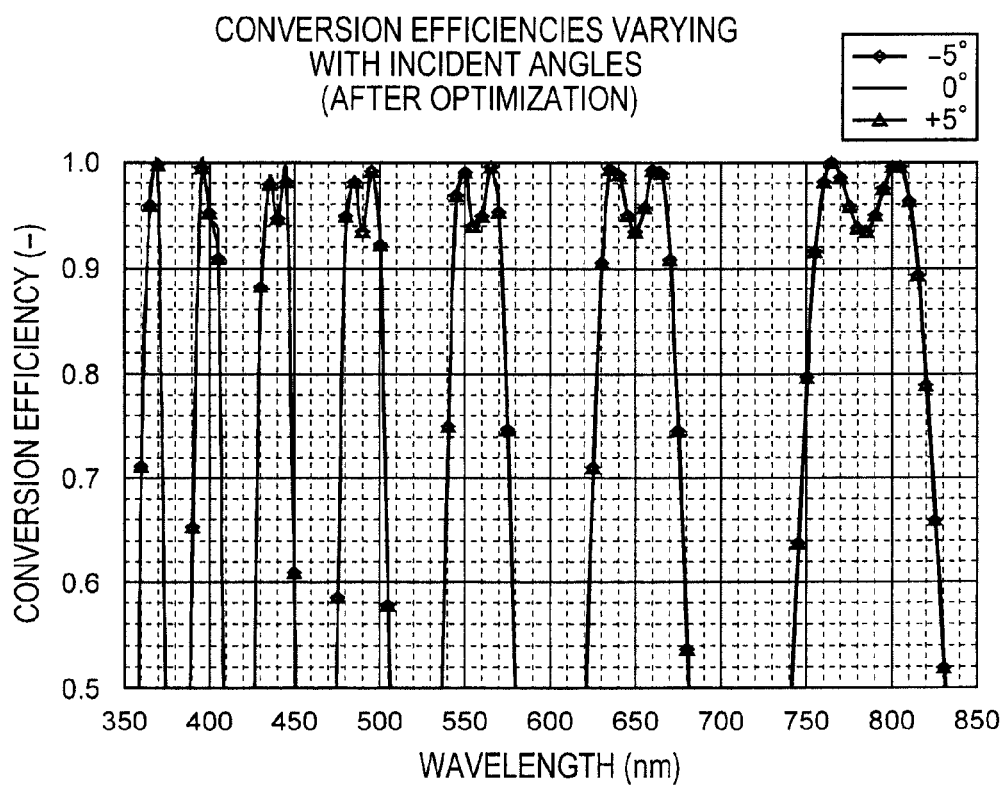

FIG. 7 is an example of other parameters according to the second embodiment. In a case in which when the cut angles of the first and the second wave plates 2' and 3' were set to be each 90° Z, the order n of the high-order mode was set to be 5 and the wavelength λ was set to be 400 nm, the phase differences Γ11 and Γ12 of the third and the fourth wave plates 2' and 3' were 3960° and 1980°, respectively, and the optical axis azimuth angles θ3 and θ4 were −16° and 45°, respectively, the wavelength-conversion efficiency characteristics became favorable. FIG. 7(a) is a drawing for showing the conversion efficiencies of the laminated half-wave plate 1' with respect to the wavelengths from 350 to 750 nm. The conversion efficiencies of the laminated half-wave plate 1' obtained when the incident angle is 0° are indicated by solid lines, while the conversion efficiencies obtained when the incident angles are −5° and +5°, respectively, are indicated by putting rhombic or triangular marks. They almost overlap to form curves. The case of this embodiment attained the conversion efficiency 0.93 required as a half-wave plate in the 405 nm band, the 660 nm band and the 785 nm band for a triple-wavelength compatible optical pickup and resulted in values equal to or greater than 0.94. Furthermore, when optimization was attempted for the θ3 and the θ4, compared with the wavelength-conversion efficiency characteristics shown in FIG. 7(a), the wavelength-conversion efficiency characteristics, as shown in FIG. 7(b), could increase the bandwidths of the 405 nm band, the 660 nm band and the 785 nm band, respectively. Additionally, values of the respective optical axis azimuth angles after the optimization are θ3=−21° and θ4=37.5°.

Figure 8A:
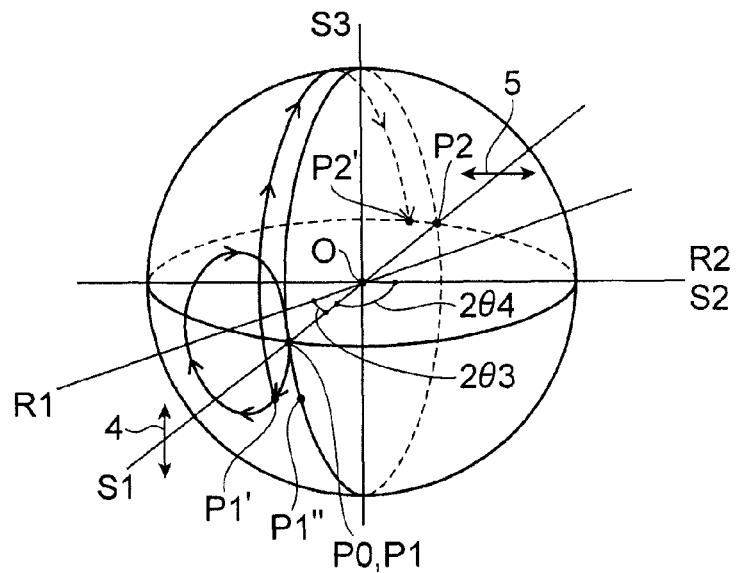
FIG. 8(a) is a perspective view of a Poincare sphere for explaining the present invention; (b) is a perspective view to an S1S3 plane of the Poincare sphere; and (c) is a perspective view to an S2S3 plane of the Poincare sphere.
Figure 8B:
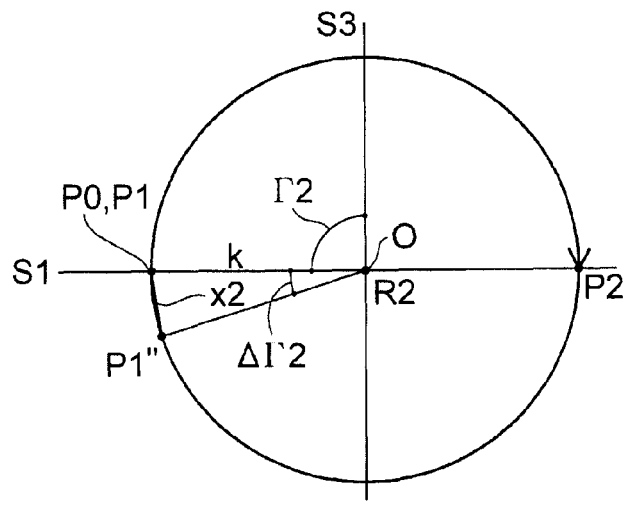
Figure 8C:
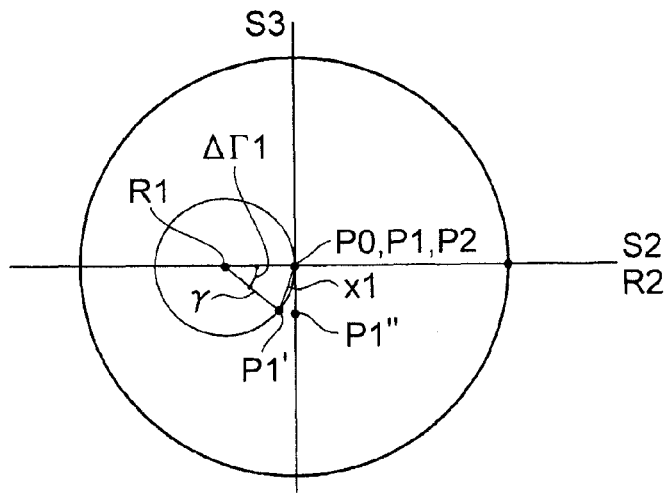

Here, regarding optical mechanisms of the first wave plate 2' and the second wave plate 3' forming the laminated half-wave plate 1' shown in FIG. 5, an explanation will be given using FIG. 8. FIG. 8(a) is a drawing for explaining a transition of a path of the linearly polarized light 4 incident on the half-wave plate 1' on the Poincare sphere. FIG. 8(b) is a drawing of the path of the polarization state of the light incident on the half-wave plate 1' on the Poincare sphere shown in FIG. 8(a), which is viewed from an S2 axis direction (the drawing thereof projected on an S1S3 plane). FIG. 8(c) is a drawing of the above path of the polarization state when viewed from an S1 axis direction (the drawing thereof projected on an S2S3 plane) in order to explain about the function of the first wave plate 2' of the laminated half-wave plate 1' according to the invention. In FIGS. 8(b) and (c), it is shown that when a ray of the linearly polarized light 4 enters the predetermined position P0 on the equator of the Poincare sphere, the ray is rotated by 360° around the optical axis R1 by the first wave plate 2' to reach the P1 (P0=P1), and then is rotated by 180° around the optical axis R2 by the second wave plate 3' to reach the P2 (the equator), whereby a ray exiting the laminated half-wave plate 1' turns to be the linearly polarized light 5 rotated by 0=90° with respect to the linearly polarized light 4 to exit the laminated half-wave plate 1'.

Here, when the phase difference Γ22 of the second wave plate 3' causes a phase change of ΔΓ2 due to a change in the wavelength of the incident light, if the phase change ΔΓ2 is offset by a phase change ΔΓ1 due to the wavelength of the first wave plate 2', wavelength dependency of the laminated half-wave plate 1' is suppressed, so that it can function as a half-wave plate in the plurality of wavelength bands.

Moreover, the phase change ΔΓ2 due to the wavelength of the second wave plate 3' has a constant value determined by wavelength dispersion of a substrate material. As for the phase change ΔΓ1 due to the wavelength of the first wave plate 2', it is possible to vary its magnitude by adjusting the in-plane azimuth angle θ3 of the first wave plate 2'. Thus, a relationship formula between the first wave plate 2' and the second wave plate 3' will be introduced below. When a wavelength of the incident light changes between the wavelengths λ1 and λ2 (λ1<λ2) from a reference wavelength (designed wavelength) λ0, the phase differences of the first wave length 2' and the second wave length 3' change from the Γ11 and the Γ22, respectively, due to the wavelength dependency of the wave plate.

Additionally, in the phase difference of the second wave plate,
Γ211: a phase difference at the wavelength λ1; and
Γ222: a phase difference at the wavelength λ2
are defined, whereby the phase change ΔΓ2 due to the wavelength of the second wave plate 3' satisfies a following formula:

$$\Delta\Gamma 2 = (\Gamma 222 - \Gamma 211)/2 \qquad (14).$$

In FIG. 8(b), it is set that the coordinate P0 (P1) on the Poincare sphere changed to a P1'' due to the phase change ΔΓ2 caused at the second wave plate 3', and when a distance of the P0→P1'' is approximately expressed by a straight line x2, the ΔΓ2 and the x2 satisfy a relationship of a below formula (1):

$$(x2)^2 = 2k^2 - 2k^2 \cos \Delta\Gamma 2 \qquad (15).$$

Here, k indicates a radius of the Poincare sphere.
Next similarly, in FIG. 8(c), it is set that the coordinate P0 (P1) on the Poincare sphere changed to a P1' due to the phase change ΔΓ1 caused at the first wave plate 2', and when a distance of the P0→P1' is approximately expressed by a straight line x1, the ΔΓ1 and the x1 satisfy a relationship of a below formula (16):

$$(x1)^2 = 2r^2 - 2r^2 \cos \Delta\Gamma 1 \qquad (16).$$

Here, r indicates a radius when rotated by Γ11 around the R1 as a rotational axis.

Additionally, the r can be expressed by a below formula (17) using the in-plane azimuth angle θ3 of the first wave plate 2'.

$$r^2 = 2k^2 - 2k^2 \cos 2\theta 3 \qquad (17).$$

Furthermore, when the formula (17) is substituted into the formula (16), a formula (18) is obtained:

$$(x1)^2 = 4k^2(1 - \cos 2\theta 3)(1 - \cos \Delta\Gamma 1) \qquad (18).$$

Thus, in order to mutually offset the phase changes of the first wave plate 2' and the second wave plate 3', $$x1 \approx x2$$

is required, and with the formula (15) and the formula (18), a relationship between $$(x1)^2 = (x2)^2; \text{ and}$$

$$2k^2 - 2k^2 \cos \Delta\Gamma 2 = 4k^2(1-\cos 2\theta 3)(1-\cos \Delta\Gamma 1)$$

is established.

Thus, when the k is normalized and integrated, a formula (19) is obtained:

$$\cos 2\theta 3 = 1 - (1-\cos \Delta\Gamma 2)/\{2(1-\cos \Delta\Gamma 1)\} \quad (19).$$

Next, when the first wave plate 2' and the second wave plate 3' are composed of a substrate material of the same dispersion and $$\Gamma 11/\Gamma 22 = m$$

is set, a formula (20) is obtained:

$$\Delta\Gamma 1 = m\Delta\Gamma 2 \quad (20).$$

Thus, when the formula (20) is substituted into the formula (19), a formula (21) is obtained:

$$\cos 2\theta 3 = 1 - (1-\cos \Delta\Gamma 2)/\{2(1-\cos m\Delta\Gamma 2)\} \quad (21).$$

The formula (21) shows that the in-plane azimuth angle θ3 of the first wave plate 2' is determined by the phase change ΔΓ2 caused by the second wave plate 3'.

Next, using the above-mentioned calculation formula, detailed parameters of the first wave plate 2' and the second wave plate 3' forming the laminated half-wave plate 1' will be calculated.

As a concrete example, the parameters will be calculated about a laminated half-wave plate functioning as a half-wave plate in a plurality of wavelength bands, in the wavelengths from 350 to 850 nm bands.

For example, when the phase difference of the first wave plate 2' is Γ11=3240° (=360°+360°×2×4) and the phase difference of the second wave plate 3 is Γ=1620° (=180°+360°×4), $$m = \Gamma 1/\Gamma 2 = 2$$

is established.

Next, as for the θ4, a value of the θ4 is set to be 45° in order to emit as a linearly polarized light obtained by rotating the polarizing direction of a linearly polarized light incident on the second wave plate 3' by 90°. Meanwhile, for a purpose of optimization with respect to solutions obtained by the above-mentioned simulations, a variable range was set to be ±10°, and $$\theta 4 = 45° \pm 10° \quad (22)$$

was set.

Figure 9:
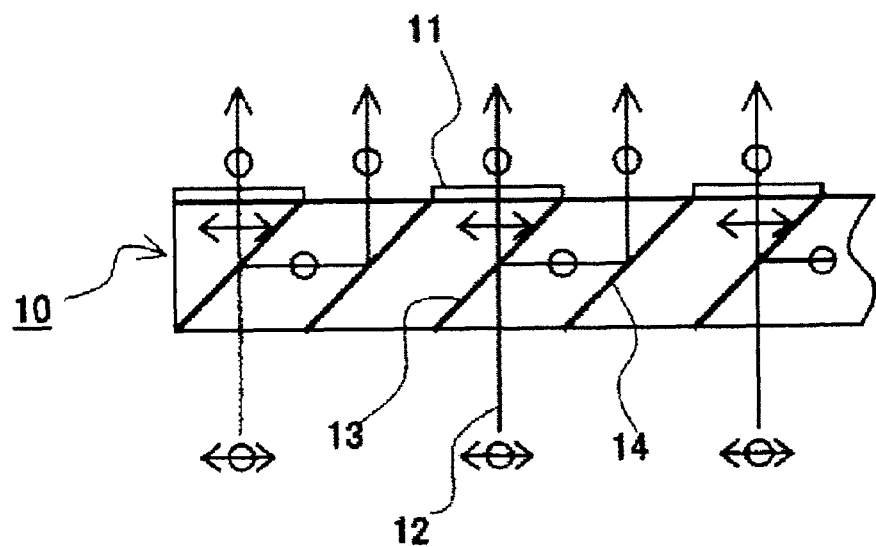
FIG. 9 A schemtic view showing a structure of a polarizing converter according to the invention.

FIG. 9 is a structural diagram for showing an example of a polarizing converter according to the invention. The polarizing converter is formed by laminating the above-mentioned laminated half-wave plate 11 according to the invention onto a plane through which a P polarized light of a polarized light beam splitter array (polarized light separation element) 10 exits. As it is known, a structure of the polarized light beam splitter array 10 is formed, as shown in FIG. 9, by mutually bonding side surfaces of a plurality of parallelepiped transparent members formed by using optical glass or the like. Inclined planes of a plurality of parallelogram prisms are bonded together to form a polarized light separation portion 13 on one of the inclined planes of the bonded prisms and to form a reflective film 14 on the other inclined plane thereof. As for a mechanism of the polarizing converter, when light (random light) 12 is incident on an incident plane of the polarized light beam splitter array 10, a P polarized light in the random light transmits through the polarized light separation portion 13 to exit by being converted into an S polarized light by the laminated half-wave plate 11 bonded onto the light exiting plane of the polarized light beam splitter array 10. Meanwhile, an S polarized light in the random light is reflected by the polarized light separation portion 13 and then reflected by the reflective film 14 to exit the polarizing converter. Characteristics of the polarizing converter of the invention are to exhibit a favorable conversion efficiency from the P polarized light to the S polarized light and to be able to produce strong polarized light.

Figure 10:
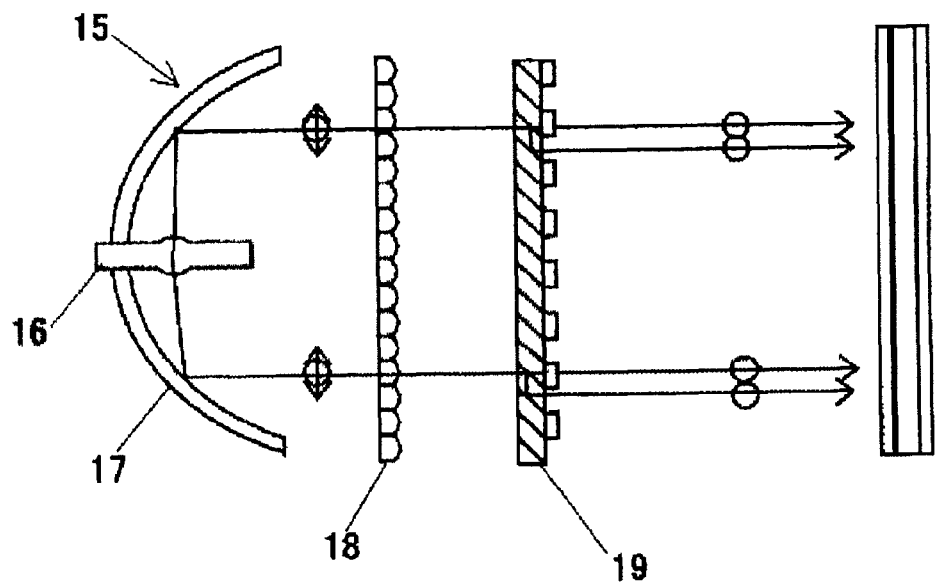
FIG. 10 A schemtic view showing a structure of a polarized light illumination device according to the invention.

FIG. 10 is a structural diagram for showing an example of a polarized light illumination device according to the invention. The device includes a light emitting light source 15, a lens array 18 and the laminated half-wave plate 19 of the invention explained above. The light emitting light source 15 includes a lamp 16 such as an ultra-high-voltage mercury lamp or a xenon lamp and a reflective mirror 17, for example, a paraboloidal reflective mirror. Light emitted from the lamp 16 is a light approximately parallel to an optical axis of the paraboloidal reflective mirror 17. Additionally, the light emitted from the lamp 16 is a natural light (random light) and can be expressed by a sum of two linearly polarized lights (a P polarized light and an S polarized light) that have an equal intensity and intersect with each other. It is the polarized light illumination device in which the random light transmits through the laminated half-wave plate 19 and thereafter is converted into only an S polarized light.

Figure 11A:
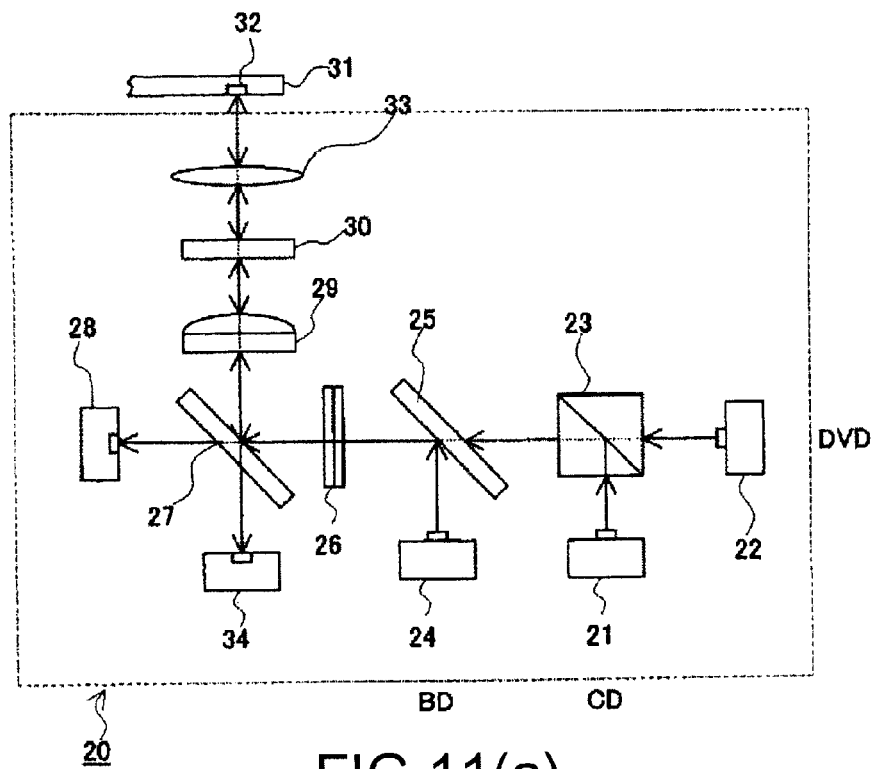
FIG. 11(a) is a block diagram of an optical pickup device according to the invention, and (b) is a block diagram of another optical pickup device according to the invention.

FIG. 11(*a*) is a block diagram for showing an example of a triple-wavelength compatible optical pickup 20 according to the present invention. It is comprised of a laser diode (hereinafter referred to as LD) 21 that emits a laser light having a wavelength of a 785 nm band corresponding to a CD, an LD 22 that emits a laser light having a wavelength of a 660 nm band corresponding to a DVD, a dichroic prism 23 that reflects the laser light as a linearly polarized light emitted by the LD 21 and transmits the laser light as a linearly polarized light emitted by the LD 22, an LD 24 that emits a laser light having a wavelength of a 405 nm band corresponding to a BD (a blue laser disc typified by a Blu-ray disc using a blue-purple laser beam having a wavelength of 405 nm band or an HD-DVD), a wavelength separation element 25 that reflects a linearly polarized laser light emitted by the LD 24 and transmits the laser lights reflected and transmitted through the chronic prism 23, a laminated half-wave plate 26 that converts phases of the laser lights reflected and transmitted through the wavelength separation element 25 by 180° to emit, a mirror 27 that reflects and transmits the laser lights emitted by the laminated half-wave plate 26 at a predetermined ratio, a front monitor (FM) 28 that monitors the laser lights transmitted through the mirror 27, a collimate lens that makes the laser lights reflected the mirror 27 parallel lights, a quarter-wave plate 30 that converts a linearly polarized light transmitted through the collimate lens 29 into a circularly polarized light, a collective lens 33 that collects laser lights in a pit 32 formed in an optical disc 31 and a photo detection element (PD) 34 that detects laser lights reflected at the pit 32 via the collective lens 33, the quarter-wave plate 30, the collimate lens 29 and the mirror 27. The optical pickup uses the half-wave plate for the purpose of changing a relative angle between a far-field pattern and a plane of polarization.

As above, since the triple-wavelength compatible optical pickup device is formed by using the laminated half-wave plate of the invention, there is an effect that the triple-wavelength compatible optical pickup device can be formed with only a single laminated half-wave plate by using the laminated half-wave plate according to the invention, although the conventional structure needed three half-wave plates.

Figure 11B:
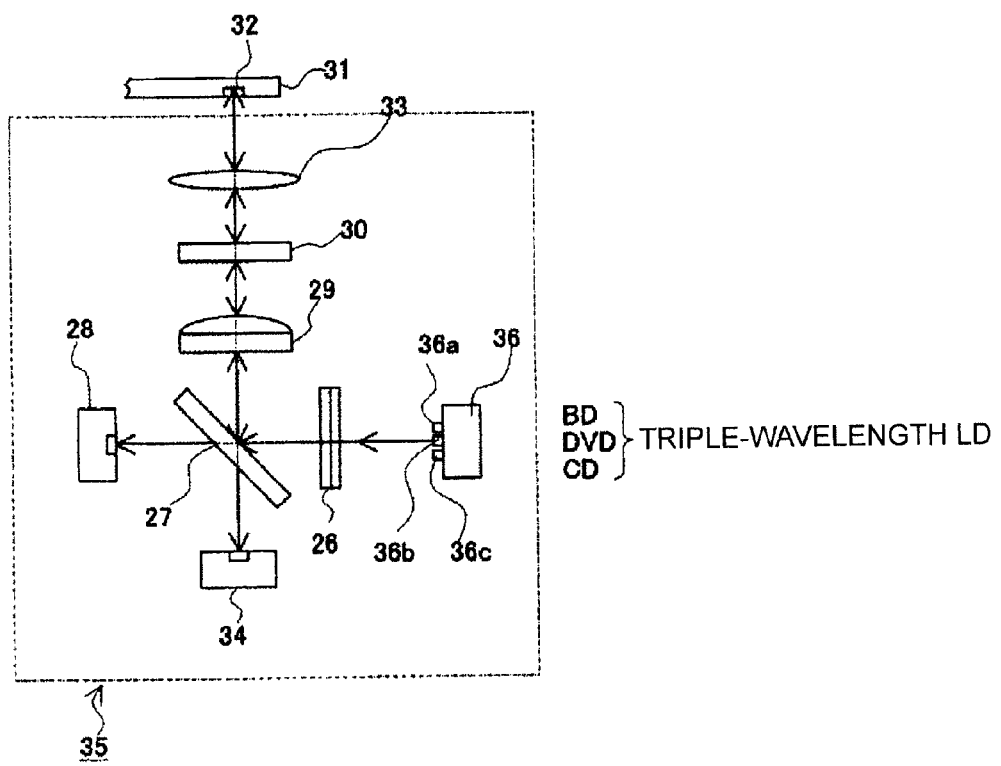
Figure 12A:
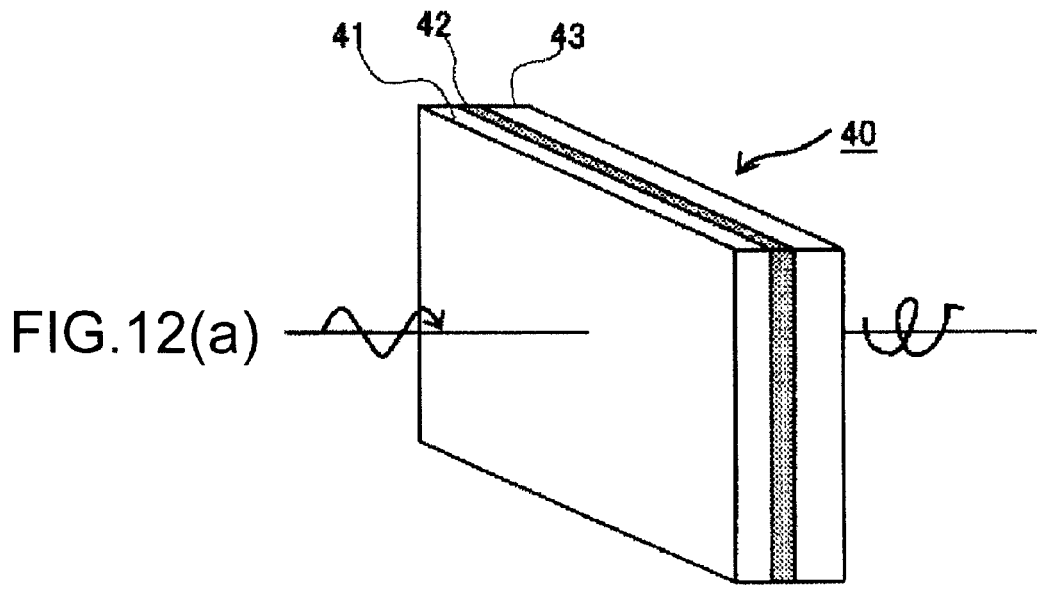
FIG. 12(a) is a perspective view showing a structure of a conventional quarter-wave plate, and (b) is a drawing showing a streching axis direction of each wave plate.
Figure 12B:
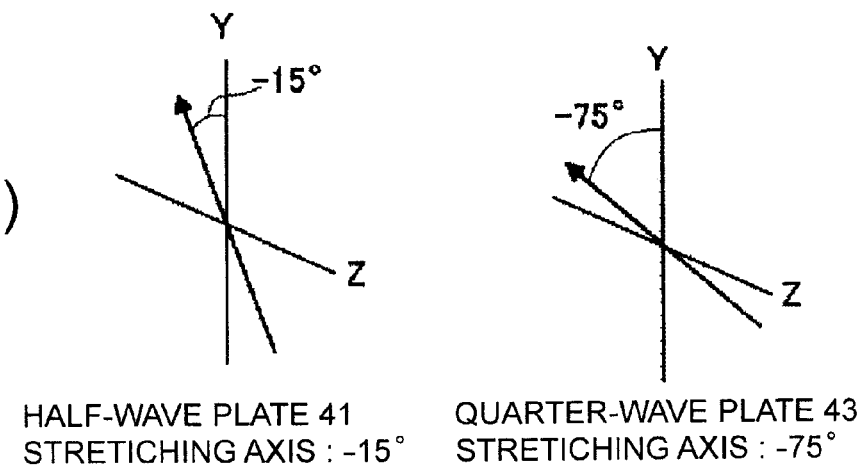
Figure 13A:
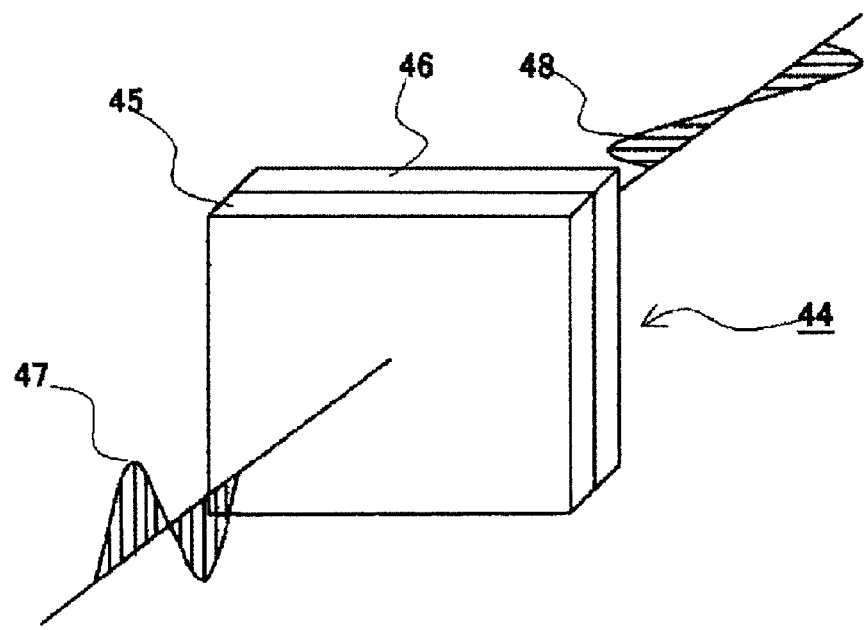
FIG. 13(a) is a schematic perspective view showing a structure of a conventional laminated half-wave plate of a single mode, and (b) is an exploded perspective view thereof.
Figure 13B:
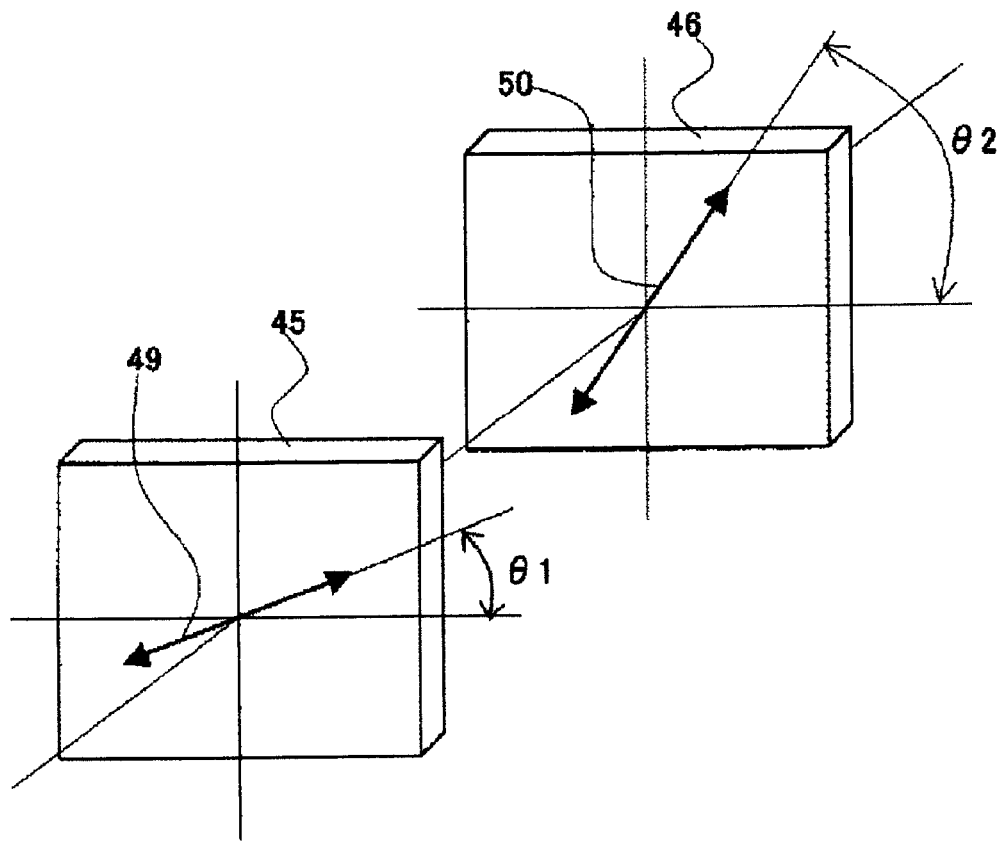
Figure 14:
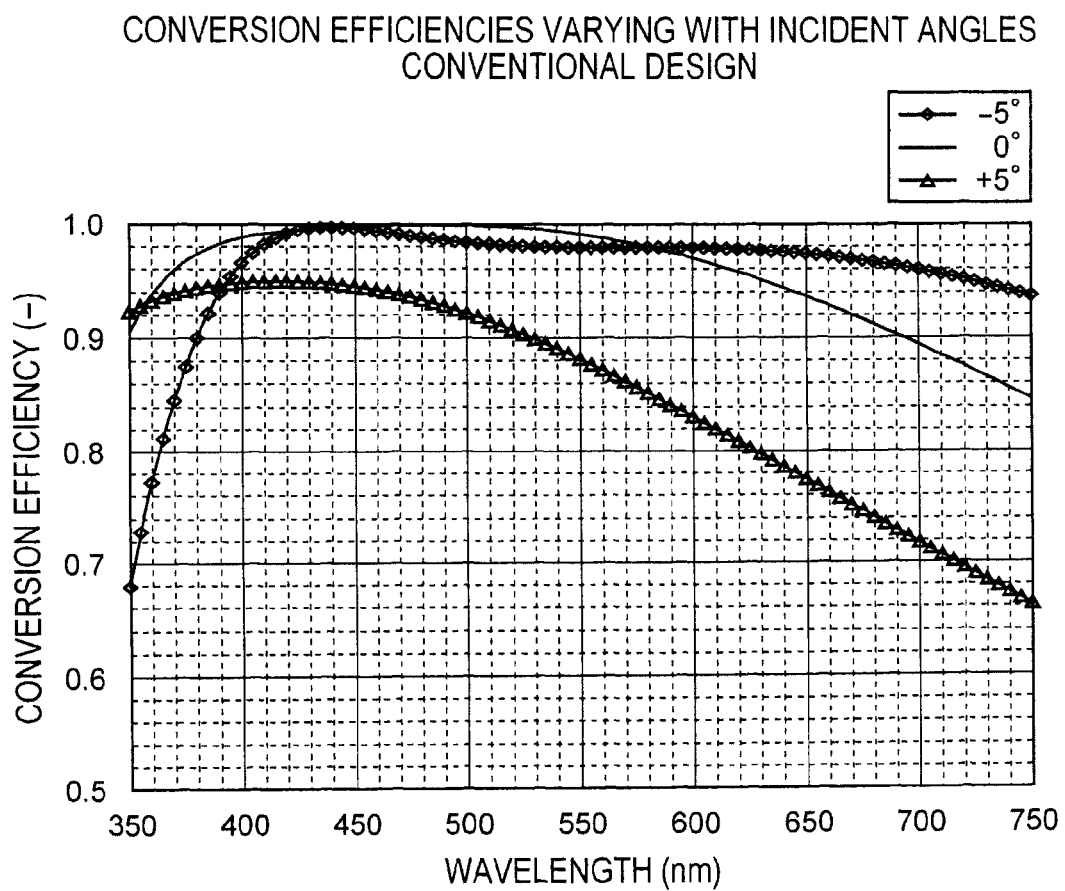
FIG. 14 A wavelength-conversion efficiency characteristic view of the conventional laminated half-wave plate of the single mode.

Additionally, using a recently developed triple-wavelength compatible light emitting laser diode and the laminated half-wave plate of the invention allows formation of a new triple-wavelength compatible optical pickup device. The same symbols will be used for the same optical devices as those in FIG. 11(a). FIG. 11(b) is a block diagram for showing an example of another triple-wavelength compatible optical pickup 35 according to the invention. It is comprised of a hybrid LD 36 including LDs 36a, 36b and 37c that emit wavelengths of the 785 nm band, the 660 nm band and the 405 nm band corresponding to a CD, a DVD and a BD, respectively, the laminated half-wave plate 26 that converts a phase of any one of laser lights of the 785 nm band, the 660 nm band and the 405 nm band by 180° to emit, the mirror 27 that reflects and transmits the laser light emitted from the laminated half-wave plate 26 at a predetermined ratio, the front monitor (FM) that monitors the laser light transmitted through the mirror 27, the collimate lens 29 that makes the laser light transmitted through the mirror 27 a parallel light, the quarter-wave plate 30 that converts a linearly polarized light transmitted through the collimate lens 29 into a circularly polarized light, the collective lens 33 that collects laser lights in the pit 32 formed in the optical disc 31 and the photo detection element PD 34 that detects laser lights reflected at the pit 32 via the collective lens 33, the quarter-wave plate 30, the collimate lens 29 and the mirror 27.

As above, forming the triple-wavelength compatible optical pickup device using the laminated half-wave plate of the invention makes it possible to significantly reduce optical components, whereby there is an effect that production cost of the optical pickup device can be significantly reduced.

The invention claimed is:

1. A laminated wave plate that functions as a half-wave plate as a whole by laminating together a first wave plate having a phase difference $\Gamma 11$ with respect to a wavelength $\lambda$ and a second wave plate having a phase difference $\Gamma 22$ with respect thereto in such a manner that their optical axes intersect, the laminated wave plate comprising: when an in-plain azimuth angle of the first wave plate is set to be $\theta 3$; an in-plain azimuth angle of the second wave plate is set to be $\theta 4$; and a phase difference of the second wave plate with respect to a wavelength $\lambda 1$ is set to be $\Gamma 211$, while a phase difference thereof with respect to a wavelength $\lambda 2$ is set to be $\Gamma 222$ and the wavelength $\lambda 1$ is less than the wavelength $\lambda 2$, the laminated wave plate is formed to satisfy following formulas (4) to (7):

$$\Gamma 11 = 360° + 360° \times 2 \times n \quad (4);$$

$$\Gamma 22 = 180° + 360° \times n \quad (5);$$

$$\cos 2\theta 3 = 1 - (1 - \cos \Delta\Gamma 2)/\{2(1 - \cos \Delta\Gamma 2)\} \quad (6); \text{ and}$$

$$\theta 4 = 45° \pm 10 \quad (7),$$

in which n is a natural number starting with 1; and $\Delta\Gamma 2 = (\Gamma 222 - \Gamma 211)/2$.

2. The laminated wave plate according to claim 1, wherein n=4; and
$\theta 3 = -16°$ or $-21°$ are set.

3. The laminated wave plate according to claim 1, wherein n=5; and
$\theta 3 = -16°$ or $-21°$ are set.

* * * * *